June 20, 1933.   S. H. HADLEY   1,914,715
ELECTRICAL SWITCH
Filed Aug. 19, 1929
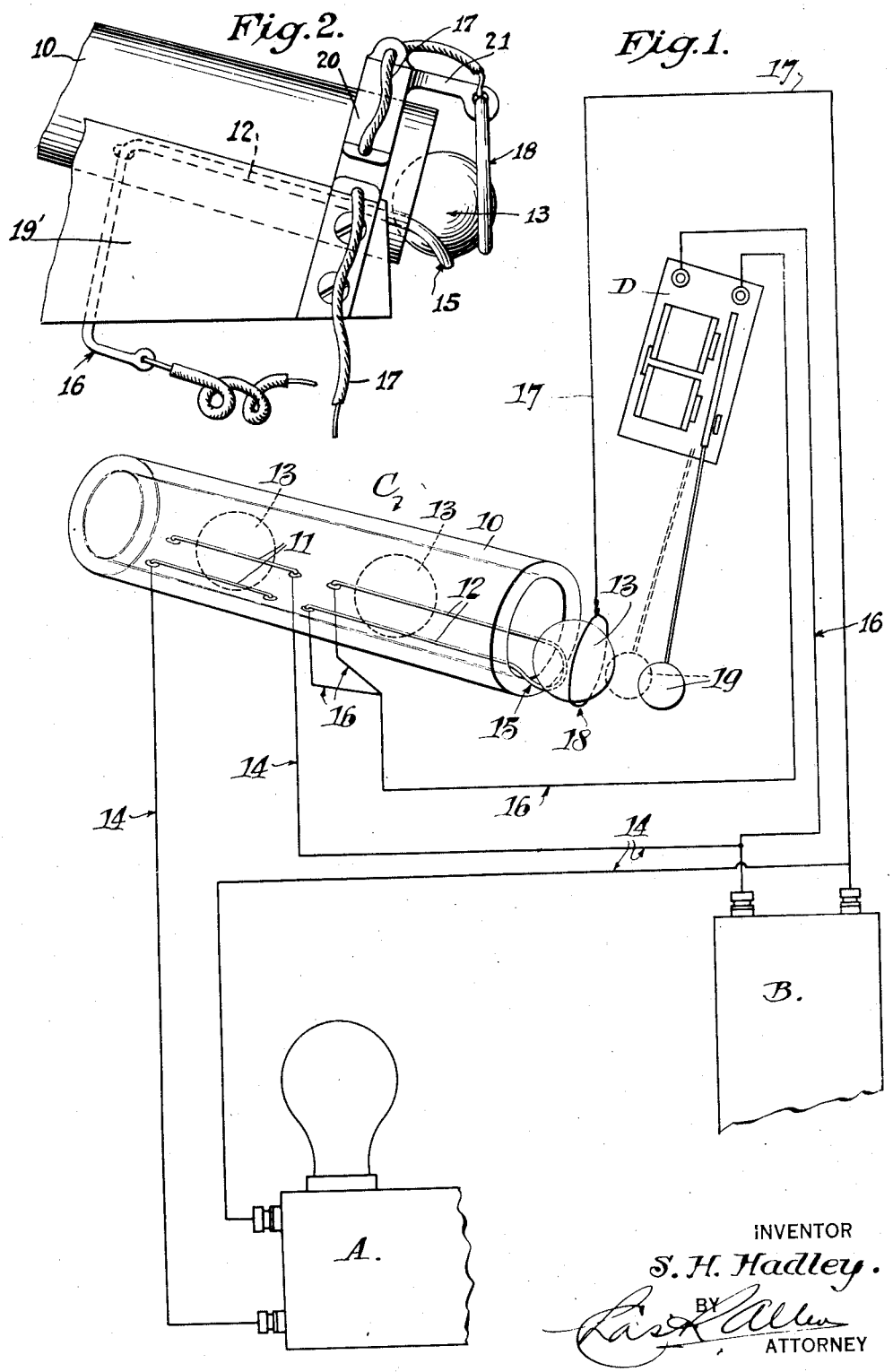
INVENTOR
S. H. Hadley.
BY
ATTORNEY Patented June 20, 1933

1,914,715

UNITED STATES PATENT OFFICE

SAMUEL H. HADLEY, OF NEW YORK, N. Y.

ELECTRICAL SWITCH

Application filed August 19, 1929. Serial No. 386,902.

This invention generally relates to electrical switches and primarily has for its object to provide a novel automatically operable switch adapted for intermittently making and breaking an electric circuit to cause intermittent operation of a motor or other electrically operated apparatus or for intermittently lighting electric lights or the like.

In its more detailed nature the invention resides in the provision of an inclined tube and a contact making and breaking ball free to roll up and down in the tube, there being provided a source of electrical energy, electrical apparatus to be intermittently energized such as a motor, lights or the like, and two open electric circuits one connected with the apparatus, one to a ball rolling device, and both to the source of energy, and adapted to be alternately closed by contact of the ball to first energize the ball rolling device to cause it to move the ball into position for temporarily closing the other circuit after which it will roll out of contact making relation with said other or apparatus connected circuit and back into position for again closing the first mentioned circuit to repeat the operation.

With these and other objects in view which will more fully appear, the nature of the invention will be more clearly understood by following the description, the appended claims and the several views illustrated in the accompanying drawing.

Figure 1 is a diagrammatic perspective view illustrating the invention.

Figure 2 is a fragmentary side elevation of the lower end of the switch and illustrates a means for mounting the ball-seat loop.

In the drawing A generally designates the motor, light or other electrical apparatus to which current is to be supplied intermittently from the battery or other source of electrical energy B under control of the switch generally designated C.

The switch is in the nature of an inclined hollow tube 10, preferably formed of glass having therein two separated and aligned sets of spaced tracks 11 and 12 up and down which a contact making and breaking ball 13 is adapted to roll freely in a manner described hereinafter. The ball 13 is formed of a good electric conductor such as copper.

The tracks of the set 11 are connected by wiring 14 with the source of energy B and with the apparatus A, forming a circuit open across the tracks 11 but adapted to be closed each time the ball 13 rolls upon said tracks.

The other tracks 12 are connected in a downturned seat 15 at the lower end and at the upper end are connected by circuit wiring 16 with the source of energy B. Another circuit wire 17 is connected to the energy source and terminates in a ball-seat loop 18 so positioned relatively to the track seat 15 as to form therewith a ball seat into which the ball may roll and complete the circuit through the energy source and the wires 16 and 17.

A vibrator unit D of the well known bell ringer type is connected in the circuit wire 16 and is actuated each time the circuit 16—B—17 is closed by the ball 13.

In operation, each time the ball 13 rolls down and seats itself in the loop 18 it forms a connection between 16 and 17 and closes the circuit in which the vibrator unit D is connected. The clapper 19 of the unit strikes the ball 13 and causes it to roll upwardly off the tracks 12 and onto the tracks 11 thereby breaking the circuit in which the vibrator unit is connected and completing the circuit including the apparatus A. Gravity causes the return of the ball to the loop seat 18 and an immediate repetition of the operation just described is the result.

The interval of time between the make and break of the circuits is regulated by the length of the wire tracks, the incline of the tube, the weight of the ball and the power of the vibrator unit.

Various means for mounting the tube 10 and ball-seat loop 18 may be employed. In Figure 2, I have shown one such mounting in which the tube 10 is supported in a base 19', a bracket member 20 being employed to secure the end of the tube in the base and including an extension 21 in which the ball-seat loop 18 is rigidly secured in any approved manner.

It is of course to be understood that the details of structure and arrangements of parts may be variously changed and modified without departing from the spirit and scope of my invention.

I claim:

1. In a track switch, an inclined trough of insulating material, an arcuate contact member spaced from and adjacent the lower end of the trough, an upper pair of parallel spaced tracks, a lower pair of parallel spaced tracks alined with the upper tracks and longitudinally spaced with reference thereto, said lower tracks being disconnected at their upper ends and joined at their lower ends in U-shape with the base of the U extended from the trough to form with the contact member a circuit closing ball receiving seat, a ball adapted to roll over the tracks to make circuit closing contact across the upper tracks and when seated to make circuit closing contact through the lower tracks jointly and the contact member, and means operable at intervals to cause the ball to be unseated and rolled over the tracks.

2. In a track switch, an inclined supporting trough of insulating material, an upper pair of parallel spaced contact tracks, a lower pair of parallel spaced contact tracks alined with the upper tracks and longitudinally spaced with reference thereto, a circuit closing ball adapted to roll on said tracks, means at the lower end of the supporting trough to form a ball receiving seat, and means operable at intervals to cause the ball to be unseated and rolled over the contact tracks, said upper tracks being wholly separated from each other to enable individual connection in a circuit, and said lower tracks being connected to enable a collective connection in a circuit.

3. In a track switch, an inclined supporting trough of insulating material, an upper pair of parallel spaced contact tracks, a lower pair of parallel spaced contact tracks alined with the upper tracks and longitudinally spaced with reference thereto, a circuit closing ball adapted to roll on said tracks, means including a loop extension of the lower tracks at the lower end of the supporting trough to form a ball receiving seat, and means operable at intervals to cause the ball to be unseated and rolled over the contact tracks, said upper tracks being wholly separated from each other to enable individual connection in a circuit, and said lower tracks being connected by said loop extension to enable a collective connection in a circuit.

In testimony whereof I affix my signature.

SAMUEL H. HADLEY.